United States Patent [19]

Beauloye

[11] 3,875,831

[45] Apr. 8, 1975

[54] PIPE FACING AND DEBURRING POWER HEAD

[76] Inventor: Ronald A. Beauloye, 612 S. Flower St., El Cajon, Calif. 90007

[22] Filed: June 18, 1973

[21] Appl. No.: 370,652

[52] U.S. Cl. .................................................. 82/4 C
[51] Int. Cl. ............................................. B23b 5/16
[58] Field of Search ....................... 82/4 C; 408/231

[56] References Cited
UNITED STATES PATENTS

| | | | |
|---|---|---|---|
| 2,679,686 | 6/1954 | Ingwer et al. | 82/4 C |
| 3,367,219 | 2/1968 | Walters | 82/4 C |

FOREIGN PATENTS OR APPLICATIONS

| | | | |
|---|---|---|---|
| 890,815 | 3/1962 | United Kingdom | 82/4 C |

*Primary Examiner*—Leonidas Vlachos
*Attorney, Agent, or Firm*—George J. Netter, Esq.

[57] ABSTRACT

A power-driven facing and deburring tool for smoothing and chamfering the unfinished ends of plastic pipe, which tool has a work-receiving bore, a coaxial rotor also received within the bore and closing one end of the bore. A cutting tool bit is mounted on the rotor for surfacing the rough unfinished edge of the pipe. The rotor advances progressively toward the pipe with each revolution of the rotor.

5 Claims, 8 Drawing Figures

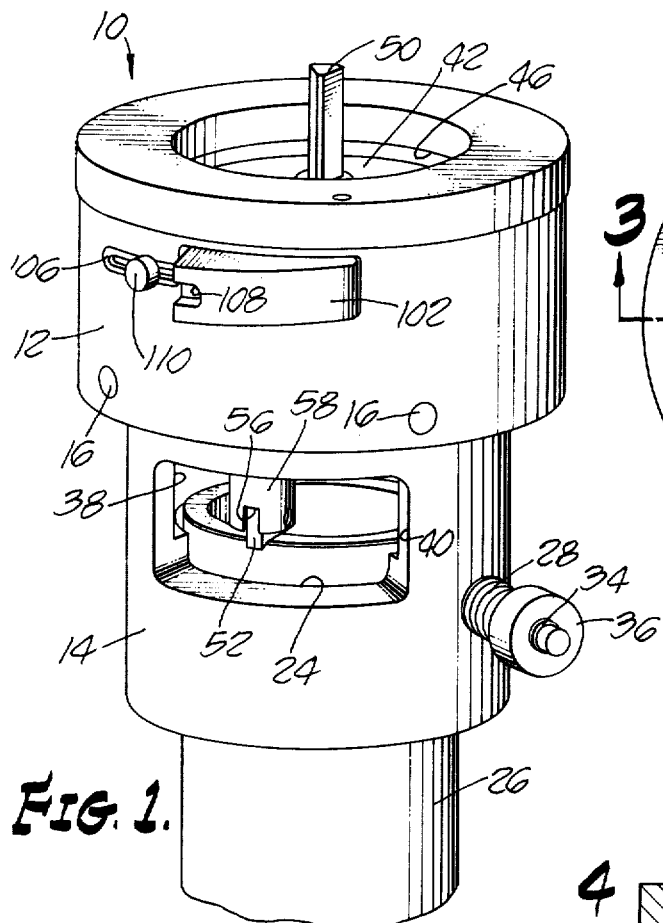
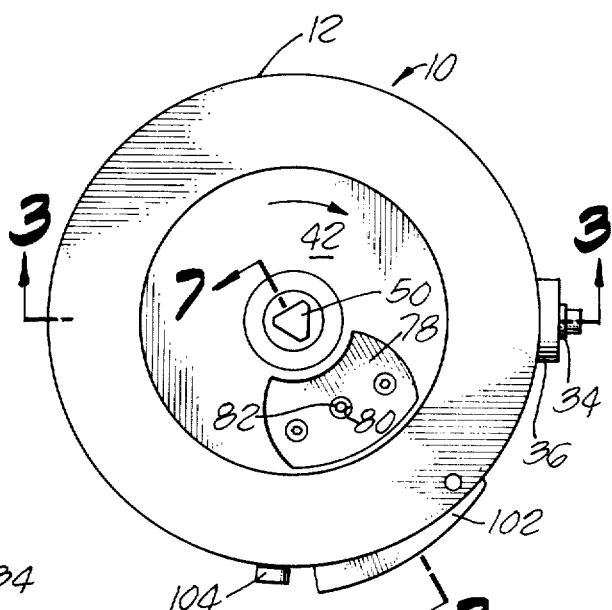
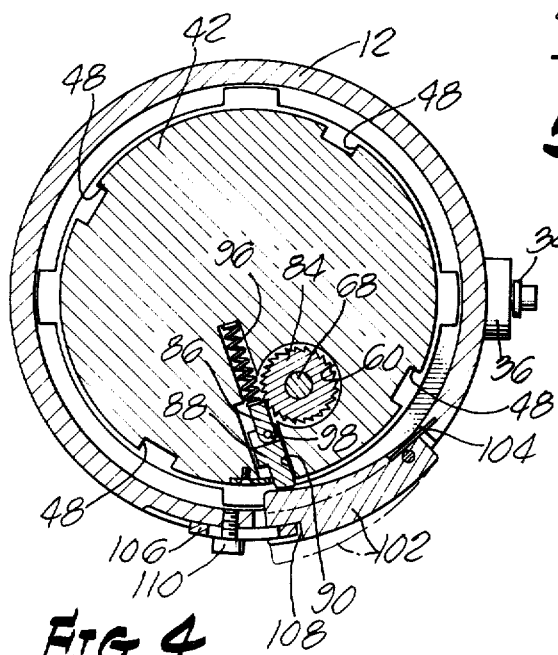
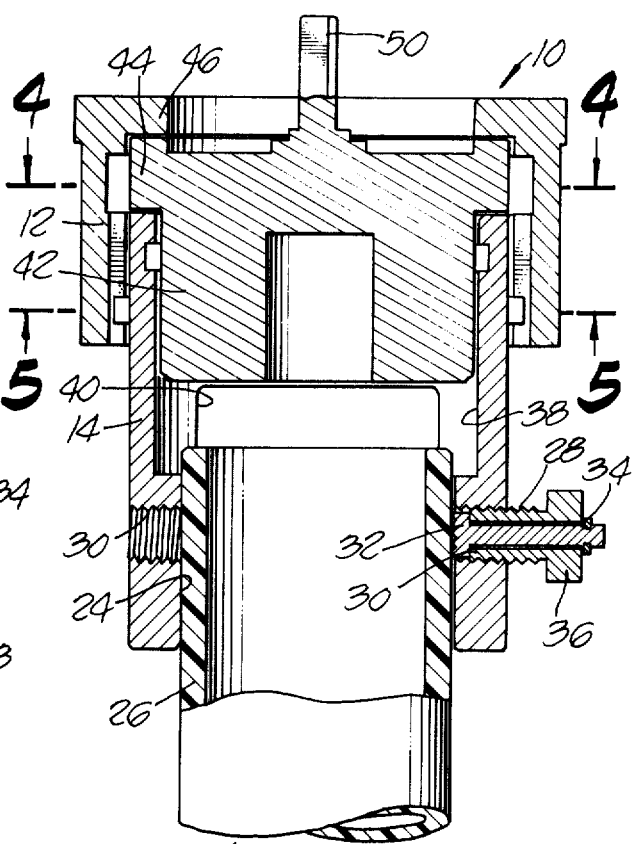

PIPE FACING AND DEBURRING POWER HEAD

The present invention pertains generally to a surfacing tool, and, more particularly, to such a tool for facing and deburring pipe end portions.

BACKGROUND OF THE INVENTION

The invention is an improvement in the facing and deburring handtool disclosed in U.S. Pat. 3,661,472 by Ronald A. Beauloye, issued May 9, 1972 for FACING AND DEBURRING HANDTOOL. The tool described in this patent, while adequate for smaller sizes of pipe, e.g., 1-inch O. D., provided difficult to use on large, heavy-duty pipes, for which considerable power is required. Moreover, there exists the need for a relatively compact, portable tool adaptable for use with conventional power drive units, such as heavy-duty portable drills, so that the larger pipes can be rough-cut and then smoothed without difficulty at the work site.

SUMMARY OF THE INVENTION

The tool includes an elongated cylindrical casing with an axial bore in one end for receiving the rough-cut end of a plastic pipe to be finished. A rotor is mounted coaxially in the bore at one end thereof. A cutting tool bit carried by the rotor projects into the peripheral portions of the bore while the opposite end of the rotor has a centrally mounted coaxial shaft for connection with a suitable rotative power source such as a power drill, for example. As the rotor rotates, the cutting tool bit moves with the rotor and advances into the bore toward the pipe end, until all the rough pipe end portions are smoothed and the pipe is finished to the proper length. The bit cutting edge has a forwardly-curved outer end so that the finished ends have a chamfered outer edge which facilitates fitting the pipe into a connecting sleeve.

DESCRIPTION OF THE DRAWINGS

FIG. 1 is a perspective view of the facing and deburring tool of this invention show operatively related with a section of pipe.

FIG. 2 is a top plan view.

FIG. 3 is a side elevational, sectional view taken along line 3—3 of FIG. 2.

FIG. 4 is a transverse sectional view taken along line 4—4 of FIG. 3.

DESCRIPTION OF A PREFERRED EMBODIMENT

Figure 5:
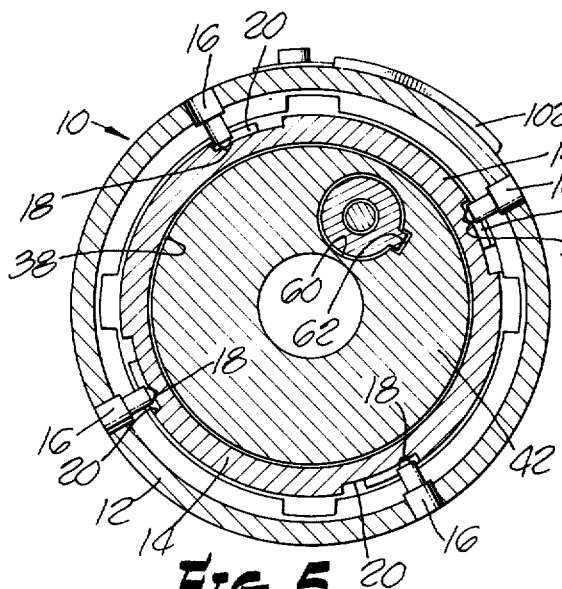
FIG. 5 is a further transverse sectional view taken along line 5—5 of FIG. 3.
Figure 6:
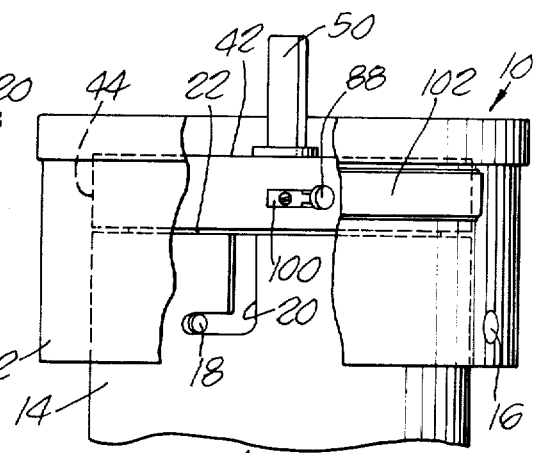
FIG. 6 is a side elevation view, partially cut away.
Figure 7:
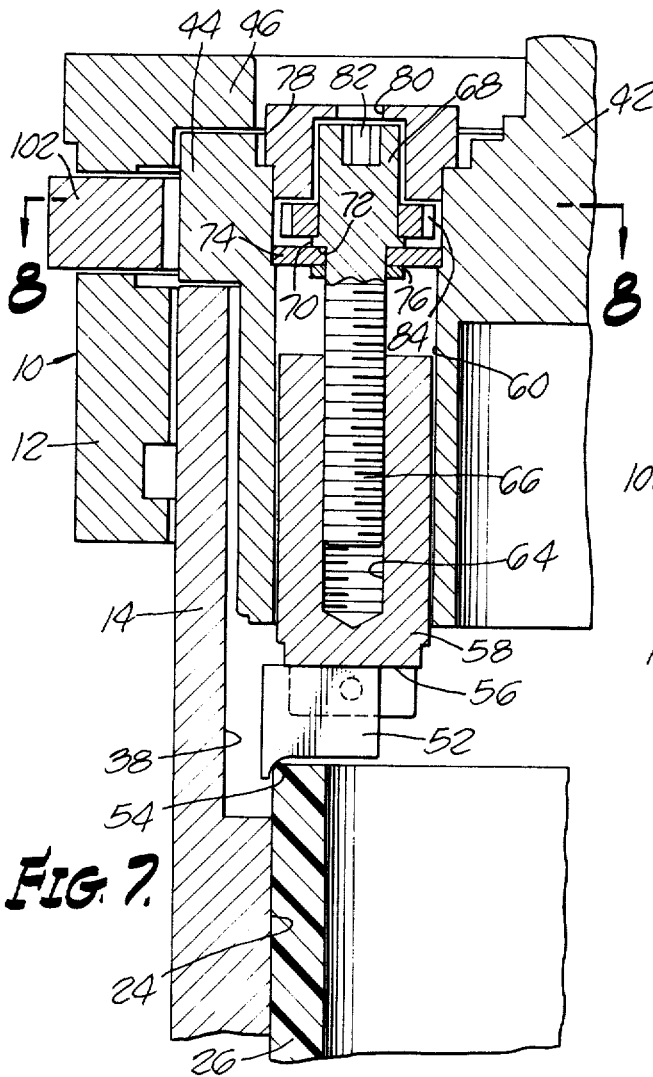
FIG. 7 is an enlarged, side elevational, sectional view taken along line 7—7 of FIG. 2.

The casing of the tool, generally indicated by the numeral 10, can be variously shaped and is illustrated in preferred form as including a hollow cylindrical housing 12 and a hollow sleeve 14 partially received within the housing. The sleeve is removable from the housing and held in place during use by any suitable locking mechanism, such as four springloaded detents 16, mounted on the housing wall with parts that extend into the housing opening or bore to seat in sockets 18 in the sleeve 14. Four L-shaped grooves or guide recesses 20 are formed in the peripheral surface of the sleeve (one for each socket 18) extending from the inner insert end 22 to the respective sockets. In connective assembly of the sleeve 14 with the housing 12, the detents are each received within a groove 20 and moved therealong until fully engaged within an associated socket 18. The L-shape of the groove and the engagement of the detents within the sockets serve to fully and securely retain the cylindrical insert within the housing.

An axially extending work-receiving bore 24, defined by the inner walls of the sleeve receives the rough-cut end portion of a pipe 26. The pipe is secured in the bore by a pair of hollow clamping screws 28 which are threadedly received in radially extending openings 30 in the sleeve. The screws carry shifted clamping pads 32 retained on the screws by clips 34. The screws are adjusted by knobs 36, and the clamping pads are rotatably adjusted to prevent the serrated faces of the pads from scarring the pipe as the screws are tightened. Although the described clamping screws are preferred, other quick-securing means, such as a lever-operated pair of knurled cams, for example, may be used instead.

The inner end portion 38 of the bore 24 is enlarged to provide a clearance space for a cutting mechanism to be described, and further portions are removed as at 40 to allow the escape of shavings produced in the finishing process, as well as incidentally reduce the overall weight of the apparatus.

A generally cylindrical rotor 42 is located coaxially within the housing 12 and has a portion received within the upper part of the sleeve 14. The upper portion of the rotor, as shown best in FIG. 3, is wider than the lower portion and includes an annular shoulder or collar 44 which seats between an annular ledge 46 formed in the outer end of housing 12 and the inner end of the sleeve 14, securing the rotor against axial movement. Since the rotor must initially be inserted into the housing 12 past the detents 16, axially extending spaced clearance slots 48 are provided in the collar 44 (FIG. 4). The rotor is free to rotate relative to the casing 10, and an externally projecting coaxial drive shaft 50 is provided for coupling the rotor to a suitable power drive (not shown) such as an electric motor, for example. The shaft has cross-sectional shape (triangular in the illustrations) to correspond to the particular type of chuck used in the power drive unit.

The rotor carries at least one tool bit 52 which has a sharp radially disposed cutting edge 54 curved at its outer end to produce a chamfer on the pipe outer edge. The tool bit is removably mounted in a slot 56 in the end of a shank 58 which is axially positionable in an off-center bore 60 in the rotor. The bore 60 has slot 62 in the side to which the shank is keyed to maintain a fixed relation of the shank relative to the rotor.

As the rotor rotates, the tool bit 52 is advanced incrementally toward the pipe end of each rotor revolution to maintain cutting engagement with the pipe end. To accomplish this advancement, the shank includes in its upper end an axially threaded bore 64 which receives an advancing screw 66. The screw has an enlarged head 68 and a circular flange 70 thereon which is received within an accommodating portion of the bore 60. A shoulder 72 abuts against a collar 74 loosely received on the head 68 while allowing it and the screw 66 to rotate. A pressed-on washer 76 holds the collar 74 in place.

A hollow retaining cap 78 is press fitted into the outer end portion of the bore 60 and over the head 68 of the advancing screw. The retaining cap has a hole 80 in the center through which an Allen-type socket 82 in the advancing screw head is accessible by an appropriate wrench for a purpose to be described. A ratchet wheel 84 is affixed onto the advancing screw head above the flange 70 immediately below the retaining cap. The ratchet wheel is engaged and turned in a manner described below as the rotor rotates, thereby turning the screw 66 to advance the tool bit toward the pipe end.

Figure 8:
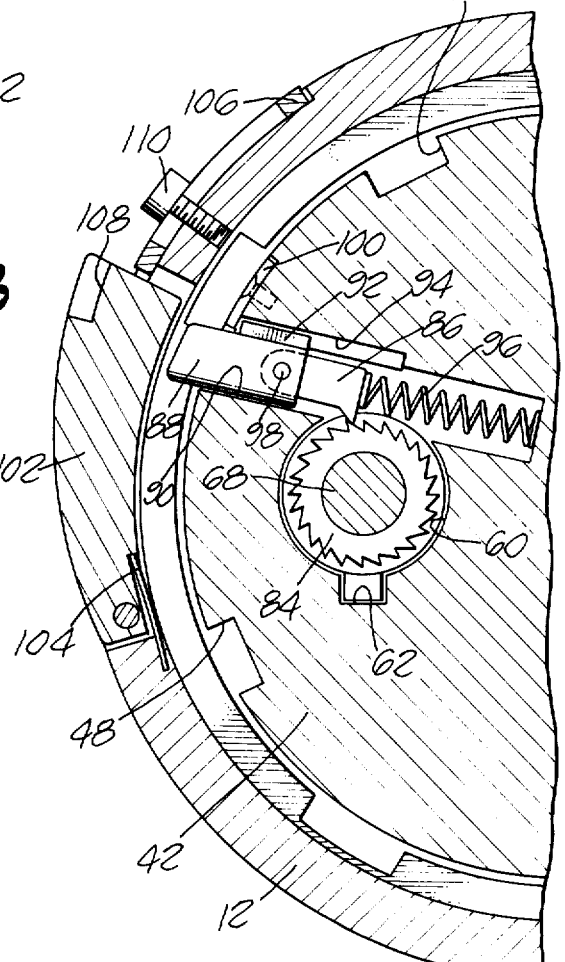
FIG. 8 is a sectional, partially fragmentary view taken along line 8—8 of FIG. 7.

Specifically, the ratchet wheel 84 is turned by a reciprocating pawl 86 carried on the end of a slide 88 which is movably received within a channel 90 of the rotor 42. The channel extends substantially radially into the rotor, intersecting an edge of the bore 60 in the plane of the ratchet wheel. The slide 88 has a key 92 which tracks in a slot 94 formed in the side of the channel 90 to maintain proper orientation of the slide and the attached pawl. Each time the pawl moves inwardly past the ratchet, it engages a ratchet tooth rotating the advancing screw a corresponding amount. For return of the pawl to its outermost position, a coil spring 96 is positioned between the pawl end and the channel inner end, urging the pawl and slide outwardly of the channel 90 to the position shown in FIG. 8 within the slide outer end extending outwardly of the rotor. The pawl is pivotally connected to the slide as at 98 so that the spring returned pawl is not blocked by the ratchet wheel. A removable retainer 100 is secured in a shallow recess in the side of the rotor, blocking the key slot 94 to prevent the escape of the pawl mechanism during use while allowing access to the mechanism for repair or replacement. The retainer allows the slide end portion to project from the channel at a distance just short of contacting the inner wall of the housing 12.

An elongated activating cam 102 is pivotally mounted at one end in a circumferentially extending opening in the side of the housing 12 with the free end biased outwardly thereof by a leaf spring 104. In the outwardly extended position (FIG. 8), the inner side of the cam is substantially coextensive with the contour of the inner housing wall surface and the cam is spaced from the end of slide 88. To set the cam 102 into operative relation with respect to the slide 88, the cam is moved radially and retained in that position by positioning the slidebar 106 into engagement with a notch 108 in the cam and locking it therein by screw 110. In this position, illustrated in FIG. 4, the cam, now in the path of the rotating slide 88, depresses the slide once each revolution of the rotor, thereby actuating the ratchet wheel and advancing the cutting tool bit correspondingly.

In operation, the rough end of the pipe is secured in the work-receiving bore of the cylinder. A portable drill or other power means is connected to the drive shaft. As power is applied, the tool bit progressively removes layers of plastic from the end of the pipe until the rough portion has been removed, the outer edge chamfered, and the pipe reduced to the desired length. Stopping advancement of the tool bit may be accomplished either by disengaging the cam 102 or disconnecting the power supply. To reset to the starting position, the advancing screw may be reverse-rotated by inserting a wrench into the socket 82, after which the tool is ready to process another pipe section.

What is claimed is:

1. Apparatus for facing the end of a pipe, comprising:

a casing having an opening therein;

a rotor received within said casing and having parts thereof in communication with the casing operation, said rotor including means for interconnection with a source of rotative power;

hollow sleeve means for receiving the pipe therein, said sleeve means being dimensioned for fitting receipt within the casing opening a limited extend;

cutting tool means carried by said rotor on the parts communicating with the casing opening for engaging the end portions of said pipe and finishing the same on rotation of the rotor;

said cutting tool means being affixed to an end of shank means received within an opening in said rotor and slidable in a direction toward and away from the pipe end being finished;

threaded means interconnecting the shank means and the rotor within said rotor opening for moving said shank means within the rotor opening;

a ratchet wheel affixed to said threaded means;

a pawl carried by said rotor and arranged to operatively engage said ratchet wheel; and cam means carried by said casing selectively positionable to engage the pawl once each revolution of the rotor for actuating said ratchet means and incrementally advancing said cutting tool means toward the pipe end being finished.

2. Apparatus for facing the end of a pipe, comprising:

a casing having an opening therein;

a rotor received within said casing and having parts thereof extending into the casing opening, said rotor including means for interconnection with a source of rotative power;

hollow sleeve means for receiving the pipe therein, said sleeve means received within the casing opening a limited extent;

cutting tool means mounted on said rotor parts extending into the casing opening for engaging the end portions of said pipe and finishing the same on rotation of the rotor, said cutting tool means being affixed to an end of shank means received within an opening in said rotor and movable in a direction toward and away from the pipe end being finished;

rotatable means interconnecting the shank means and the rotor which on rotation moves said shank means and cutting tool means relative to the pipe end;

a ratchet wheel affixed to said rotatable means;

a pawl carried by said rotor and arranged to operatively engage said ratchet wheel; and cam means carried by said casing selectively positionable to engage the pawl on revolution of the rotor for actuating said ratchet means and advancing said cutting tool means toward the pipe end being finished a predetermined amount each rotor revolution.

3. Apparatus as in claim 1, in which said cam means is selectively adjustable to a position of disengagement with said pawl, and spring means are provided urging said cam means to the disengagement position.

4. Apparatus as in claim 1, in which said threaded means includes means accessible from outside the rotor for rotating said threaded means.

5. Apparatus for facing the end of plastic pipe, comprising:

casing means adapted to be hand-held having a first cylindrical bore and a second cylindrical bore coaxial with said first bore and of lesser diameter than said first bore;

rotor means fittingly received within the casing first bore and having drive shaft means extending through the second bore and outwardly of the casing means for connection to a source of rotative power;

hollow cylindrical sleeve means having a continuous bore, a portion of which has a first diameter fittingly receiving the pipe therein and a further portion of a larger diameter, said sleeve means being received into the casing first bore with the rotor means extending into said sleeve means larger diameter bore a predetermined distance;

selectively adjustable means carried by said sleeve means for securing the pipe within said sleeve means;

facing tool means carried by said rotor engaging the end portions of said pipe on rotation of said rotor for finishing said pipe end portions;

means carried by said facing tool means for adjustably moving said facing tool means along said sleeve means; and cam means carried by said casing means selectively positionable to actuate said moving means on each rotation of said rotor means to move said facing tool means a predetermined amount along said sleeve means.

* * * * *